Figure 1:
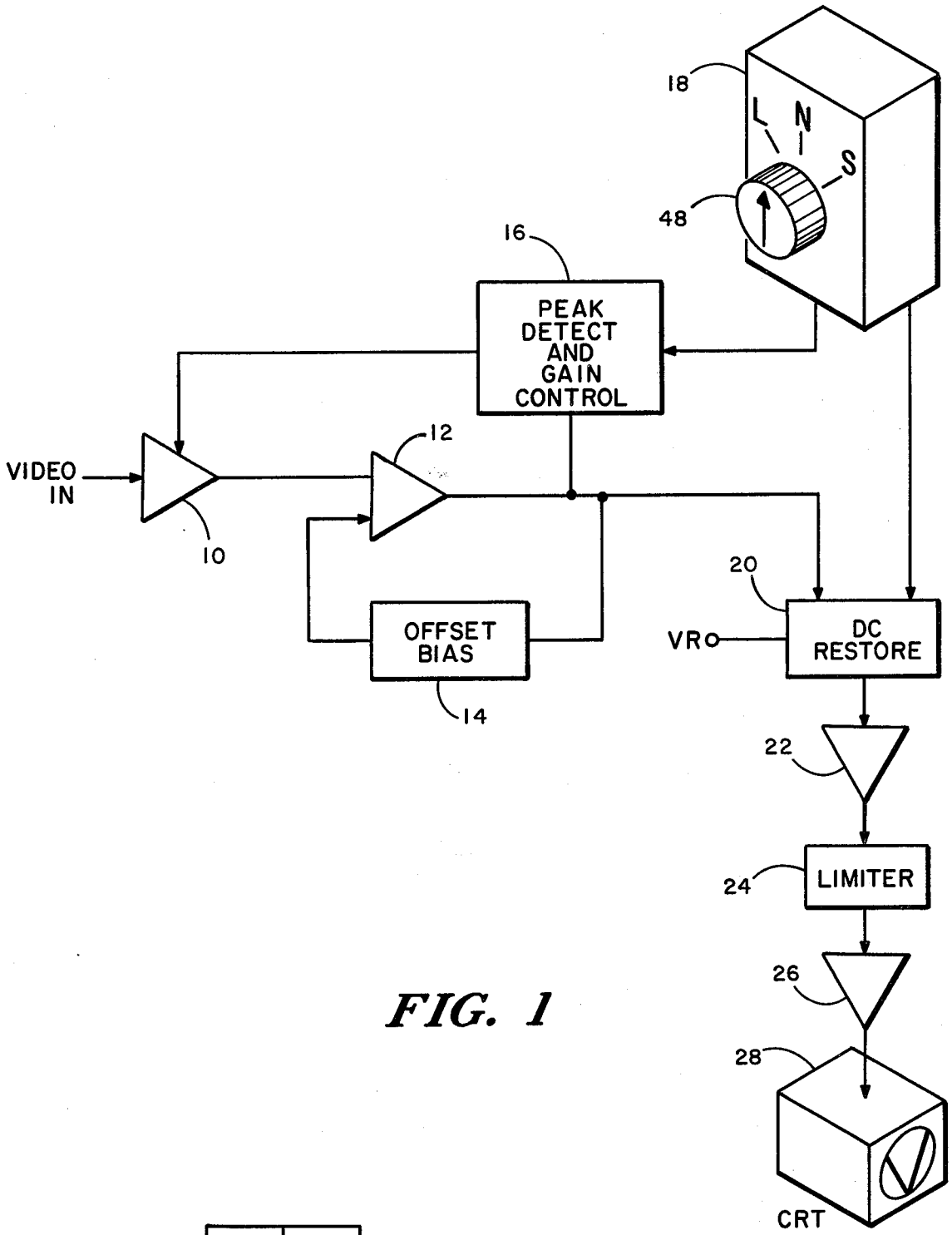
Figure 3:
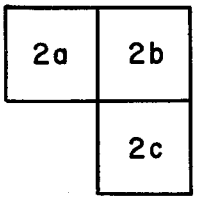
Figure 2A:
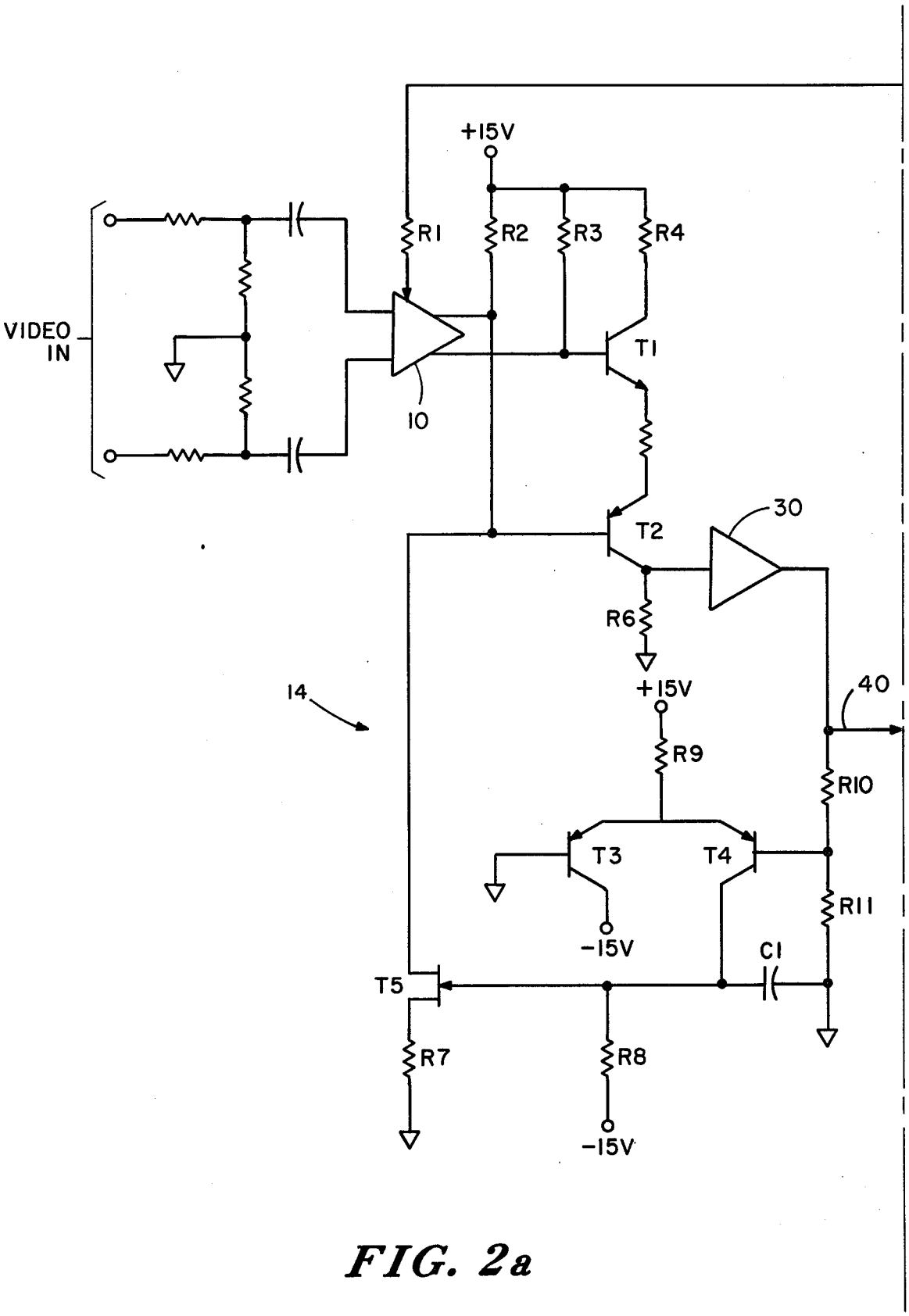
Figure 2B:
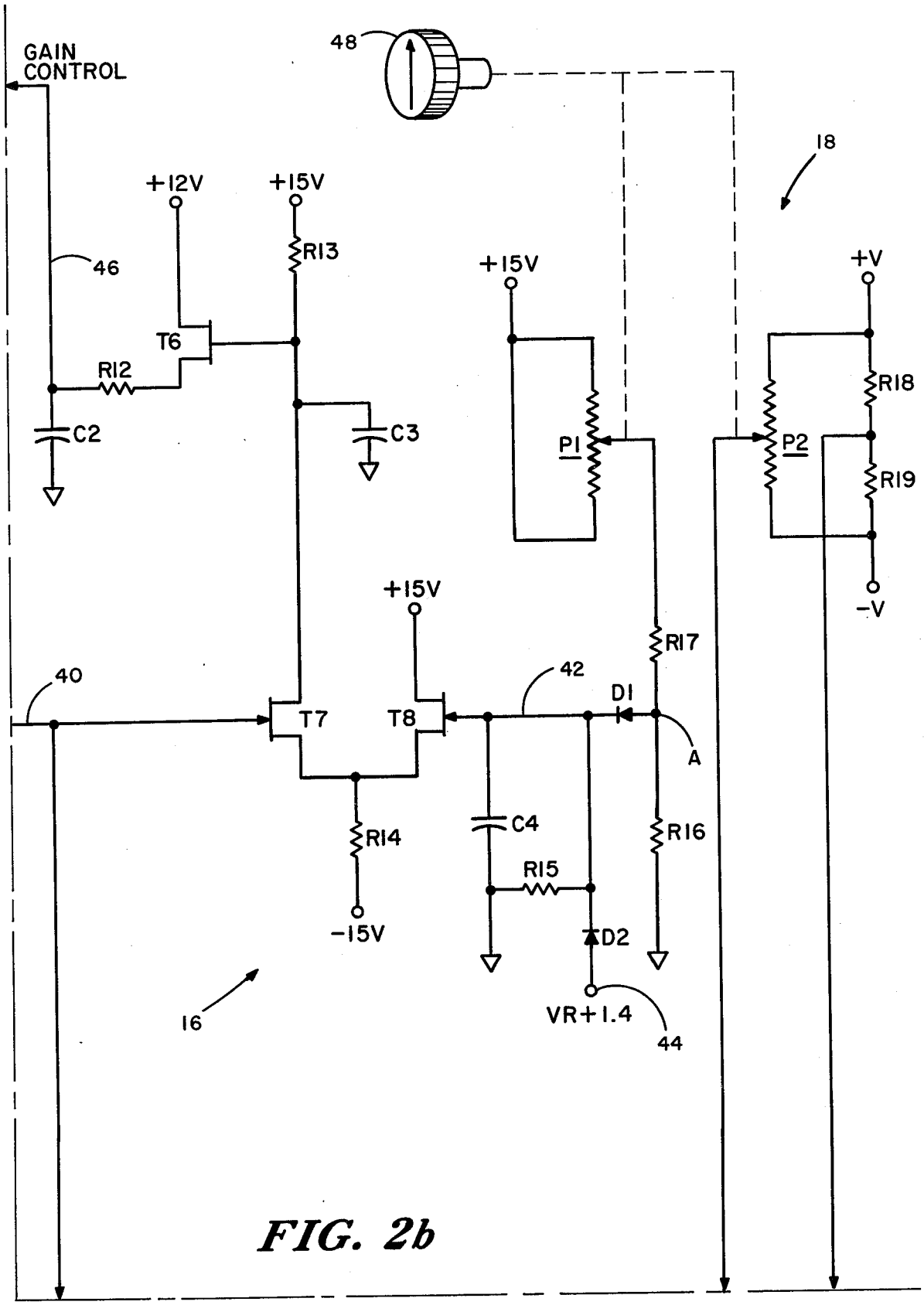
Figure 2C:
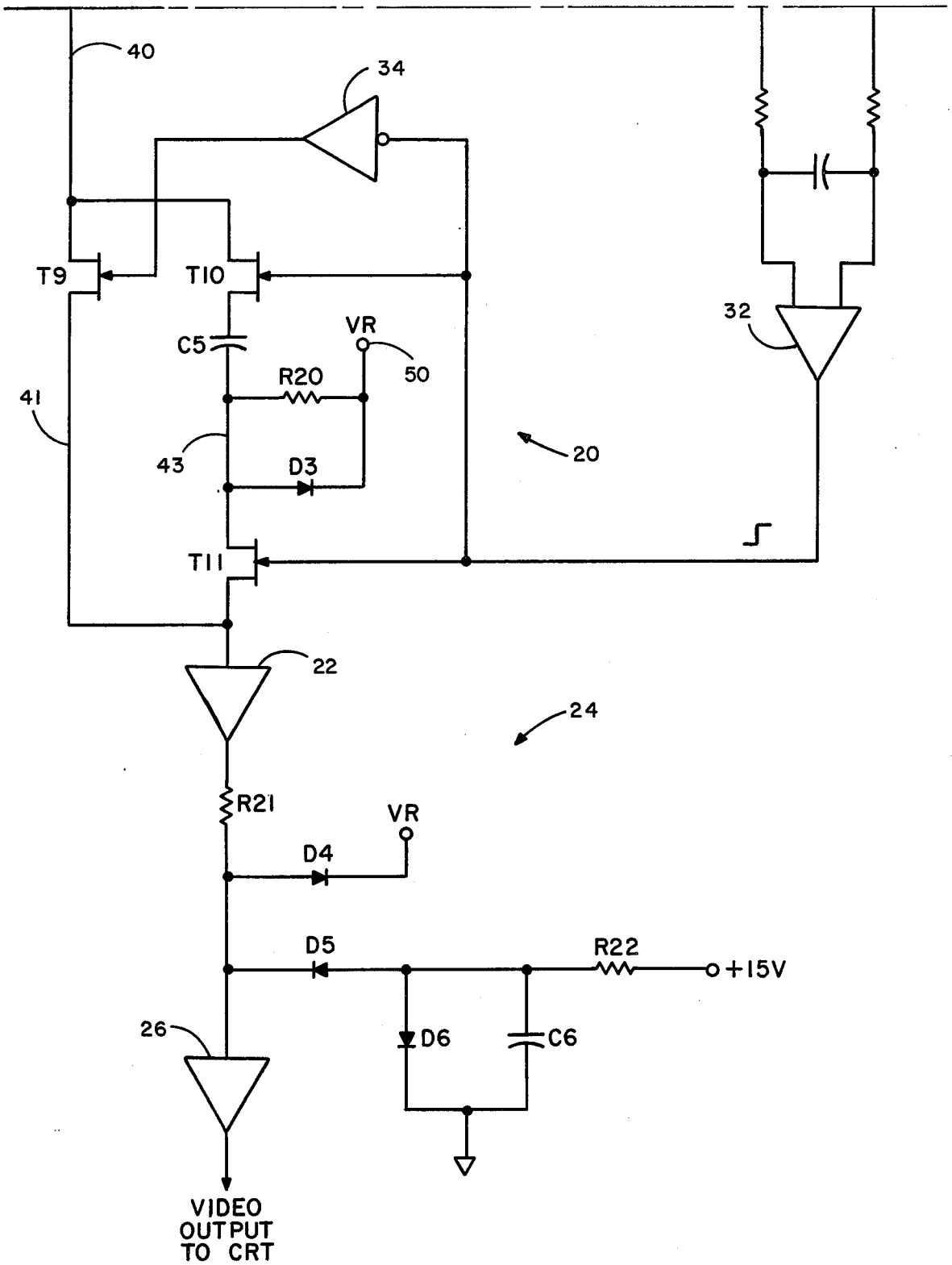
Figure 4A:
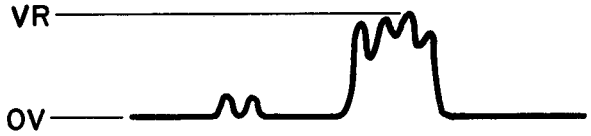
Figure 4B:
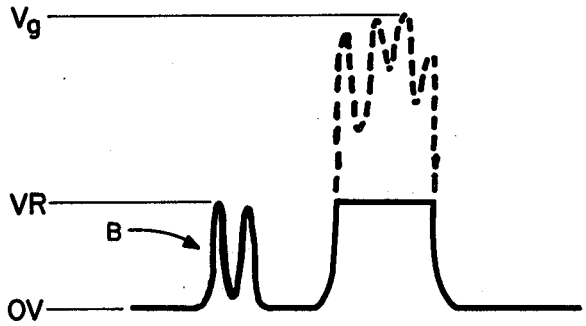
Figure 4C:
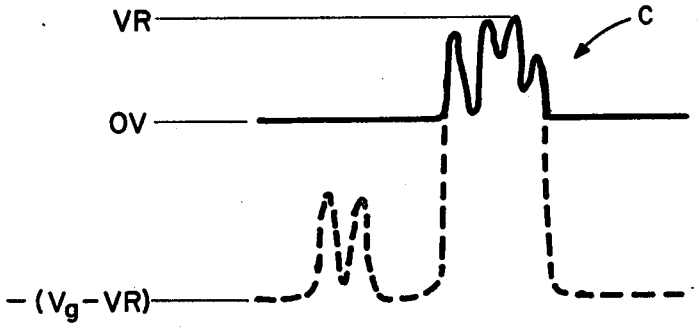

United States Defensive Publication [19] (H) [11] T954,007

Nevin et al. [43] Jan. 4, 1977

[54] SIGNAL ENHANCEMENT SYSTEM FOR RADAR DISPLAY

[75] Inventors: Robert Y. Nevin, New Hartford, N.Y.; James Allen Scheer, Stone Mountain, Ga.

[73] Assignee: General Electric Company

[21] Appl. No.: 636,890

[22] Filed: Dec. 2, 1975

[51] Int. Cl.[2] ..... G01S 7/06; H01J 29/52

[52] U.S. Cl. ..... 343/17; 315/30

[57] ABSTRACT

A system is provided for matching the dynamic range of a radar signal to the dynamic range of the CRT on which it is displayed. A variable gain amplifier 10 receives the radar video signal which it supplies to buffer amplifier 12 and offset bias circuit 14 which maintain the most negative portions of the video signal at the zero volt level, corresponding to black on the CRT display. The most positive portion of the video signal at the output of amplifier 12 is compared by peak-detect and gain control circuit 16 against a reference level, manually set by control unit 18, and the error between the two is used to adjust the gain of amplifier 10. The zero-based peak-controlled signal is presented to DC restore circuit 20 which includes an analog switch that is controlled by control unit 18. Buffer amplifier 22 passes the output from circuit 20 to a limiter circuit 24 which passes only those portions of the signal existing between zero and the reference level. The output from limiter circuit 24 is passed by an output buffer amplifier 26 to the CRT 28 for display. Weak portions of the video signal (small targets) are thus enhanced by passing the signal directly through circuit 20, and the resolution is increased for strong signal portions (large targets) by switching such signals through the DC restore network.

6 Claims, 5 Sheets Drawing,

15 Pages Specification

The file of this unexamined application may be inspected and copies thereof may be purchased (849 O.G. 1221, Apr. 9, 1968).

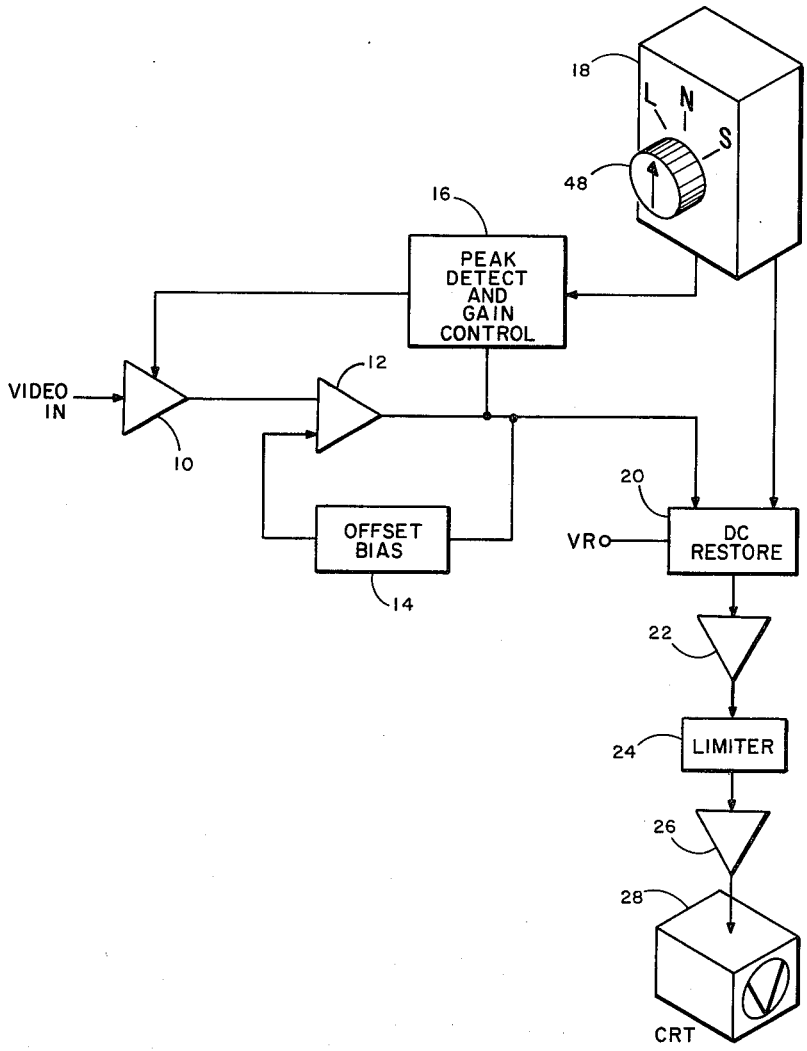

NORMAL

SMALL TARGET ENHANCEMENT

LARGE TARGET ENHANCEMENT